US012673584B2

(12) United States Patent
Okazaki et al.

(10) Patent No.: US 12,673,584 B2
(45) Date of Patent: Jul. 7, 2026

(54) POSITIONING CONFIGURATION DESIGN DEVICE, POSITIONING CONFIGURATION DESIGN METHOD, AND PROGRAM

(71) Applicant: MITSUBISHI HEAVY INDUSTRIES, LTD., Tokyo (JP)

(72) Inventors: Hirotaka Okazaki, Tokyo (JP); Kyotaro Onishi, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 840 days.

(21) Appl. No.: 18/011,220

(22) PCT Filed: Jun. 2, 2021

(86) PCT No.: PCT/JP2021/021011
§ 371 (c)(1),
(2) Date: Dec. 19, 2022

(87) PCT Pub. No.: WO2022/018977
PCT Pub. Date: Jan. 27, 2022

(65) Prior Publication Data
US 2023/0191951 A1 Jun. 22, 2023

(30) Foreign Application Priority Data
Jul. 20, 2020 (JP) ................................. 2020-123544

(51) Int. Cl.
*B60M 3/02* (2006.01)
*B61L 27/53* (2022.01)

(52) U.S. Cl.
CPC ............... *B60M 3/02* (2013.01); *B61L 27/53* (2022.01)

(58) Field of Classification Search
CPC ........... B60M 3/02; B61L 27/53; B61L 27/14; B61L 27/16; B61L 27/60
See application file for complete search history.

(56) References Cited

U.S. PATENT DOCUMENTS 11,624,619 B2 * 4/2023 Nakamura ............... B60Q 9/00
701/428
11,861,737 B1 * 1/2024 Bull ................. G06Q 10/06315
(Continued)

FOREIGN PATENT DOCUMENTS

JP        H02106447 A  *  4/1990
JP        H10164756 A     6/1998
(Continued)

OTHER PUBLICATIONS

International Search Report and Written Opinion of International Application No. PCT/JP2021/021011 mailed Aug. 17, 2021; 10pp.

*Primary Examiner* — Jason C Smith
(74) *Attorney, Agent, or Firm* — HAUPTMAN HAM, LLP

(57) ABSTRACT
This positioning configuration design device includes a positioning configuration setting unit that excludes facilities which are likely to be able to be excluded from facilities respectively positioned at a plurality of locations and sets a positioning configuration of the facilities; a feasibility confirmation unit that judges whether predetermined conditions are feasible or not in the set positioning configuration of the facilities; an exclusion candidate list updating unit that registers, in an exclusion candidate list, information of the facilities excluded in the positioning configuration in which the conditions are feasible, a non-excludable list updating unit that registers, in a non-excludable list, information of the facilities excluded in the positioning configuration in which the conditions are not feasible; and a control unit that repeatedly executes confirmation processing including setting of the positioning configuration and judgment of feasibility of the conditions while incrementing the number of facilities to be excluded one at a time until a positioning configuration in which the conditions are feasible and no
(Continued)

further facilities are able to be excluded is able to be calculated.

8 Claims, 9 Drawing Sheets

(56)                    References Cited

U.S. PATENT DOCUMENTS

| | | | |
|---|---|---|---|
| 11,948,120 B2 * | 4/2024 | Tomar .................... | G06Q 10/08 |
| 12,288,188 B2 * | 4/2025 | Tomar .................. | G06Q 10/087 |
| 12,387,548 B2 * | 8/2025 | Stephens ................ | G06Q 50/22 |
| 2023/0191951 A1 * | 6/2023 | Okazaki ................... | B60M 3/02 |
| | | | 191/2 |
| 2023/0274604 A1 * | 8/2023 | Stephens ............... | G16H 10/60 |
| | | | 705/2 |
| 2025/0270043 A1 * | 8/2025 | Srinivasan ............ | B65G 1/137 |

FOREIGN PATENT DOCUMENTS

| | | | | | |
|---|---|---|---|---|---|
| JP | 2000197270 | A | * | 7/2000 | |
| JP | 2001119858 | A | * | 4/2001 | |
| JP | 2007089250 | A | | 4/2007 | |
| JP | 2011207266 | A | * | 10/2011 | |
| JP | 2016139280 | A | * | 8/2016 | |
| JP | 2016533999 | A | * | 11/2016 | .......... G06Q 10/087 |
| JP | 2018148753 | A | * | 9/2018 | |
| JP | 2019198153 | A | * | 11/2019 | |
| WO | WO-2025151366 | A1 | * | 7/2025 | .......... G01S 13/765 |

* cited by examiner

| NUMBER OF TIMES OF PROCESSING | LIST | ID OF FACILITY REGISTERED IN LIST |
|---|---|---|
| FIRST PROCESSING | EXCLUSION CANDIDATE LIST | 2, 3, 5, 7 |
| | NON-EXCLUDABLE LIST | 1, 4, 6, 8 |
| SECOND PROCESSING | EXCLUSION CANDIDATE LIST | (2, 5)、(2, 7)、(3, 5)、(3, 7)、(5, 7) |
| | NON-EXCLUDABLE LIST | 1, 4, 6, 8、(2, 3) |
| THIRD PROCESSING | EXCLUSION CANDIDATE LIST | (2, 5, 7)、(3, 5, 7) |
| | NON-EXCLUDABLE LIST | 1, 4, 6, 8、(2, 3) |

FIG. 6

FEASIBILITY

| × | ○ | ○ | × | × | ○ | × | ○ | × |
|---|---|---|---|---|---|---|---|---|

FACILITY 1    FACILITY 2    FACILITY 3    FACILITY 4    FACILITY 5    FACILITY 6    FACILITY 7    FACILITY 8

DO NOT EXCLUDE BOTH

POSITIONING CONFIGURATION DESIGN DEVICE, POSITIONING CONFIGURATION DESIGN METHOD, AND PROGRAM

RELATED APPLICATIONS

The present application is a National Phase of International Application Number PCT/JP2021/021011 filed Jun. 2, 2021 and claims priority to Japanese Application Number 2020-123544 filed Jul. 20, 2020.

TECHNICAL FIELD

The present invention relates to a positioning configuration design device, a positioning configuration design method, and a program for optimizing positioning of various kinds of facilities. Priority is claimed on Japanese Patent Application No. 2020-123544, filed Jul. 20, 2020, the content of which is incorporated herein by reference.

BACKGROUND ART

In design of a railroad power facility, there is a need to determine a facility capacity and a location such that a voltage at a point where a train comes into contact with a pantograph is included within a stipulated range in all sorts of operations which are operationally presumed. For example, when a situation in which a plurality of trains are running at the same time in the vicinity of a certain site A is presumed, if a power facility is installed far from the site A, there is concern that a voltage supplied to the trains may fall due to a voltage drop and running ability may deteriorate. When a voltage drop is not allowed, there is a need to change the design such that the capacity of the power facility is increased or another power facility is provided near the site A.

In the related art, a positioning configuration of power facilities is designed through a procedure as follows (know-how method), for example.

(Procedure 1) A power facility is positioned in all stations in a form of being adjacent to each station.

(Procedure 2) Power facilities at unnecessary locations are excluded based on the know-how of a designer.

(Procedure 3) A simulation is performed with the designed configuration, and feasibility of various conditions is confirmed. (Procedure 4-1) When the conditions are unfeasible in Procedure 3, a power facility is added near the location where the conditions are not satisfied. Alternatively, the ability of the nearest facility is increased, an auxiliary facility is added, or the like. (Procedure 4-2) When the conditions are feasible in Procedure 3, the power facilities are excluded one at a time based on the know-how of a designer.

(Procedure 5) The process including Procedure 3 and thereafter is repeated and a facility positioning configuration is determined based on judgment of a designer.

Alternatively, in the related art, a positioning configuration of power facilities is examined using a round-robin method. For example, when there are n stations, one power facility is positioned in each station (n facilities in total). Next, processing of confirming whether there is a problem or not (for example, whether cost requirement is satisfied or whether required power can be supplied) by excluding the power facilities in the respective stations one at a time is repeatedly performed while incrementing the number of power facilities to be excluded one at a time. For example, in first processing, feasibility in a case of excluding the power facility is confirmed for each of the n power facilities. Namely, in the first processing, the foregoing processing is attempted n times. In second processing, after the power facility which has been excluded in the first processing is excluded, the foregoing processing is executed by additionally excluding another facility from the remaining n−1 power facilities. Performing the processing up to the second time by a round-robin method denotes that the processing has been attempted n(n−1) times. FIG. 10 illustrates a state of this processing. Since the same applies to third processing and thereafter, when processing a is mechanically executed in a round-robin way, an amount of calculation on the order of n! is required.

Regarding a related technology, Patent Literature 1 discloses a method for solving a mathematical programming problem obtaining a value with which positioning costs of the loop controllers in a power system are minimized, obtaining an optimum solution with which positioning costs are minimized, and minimizing the number of loop controllers to be positioned and the capacities thereof. Patent Literature 2 discloses a method for determining locations and capacities of power facilities by setting an evaluation function for calculating installation costs of the power facilities using locations of the power facilities and rated capacities of the power facilities as arguments in a transportation system for operating trains by means of power and solving an optimization problem minimizing the value of the evaluation function while satisfying constraint conditions for voltages supplied to the trains.

CITATION LIST

Patent Literature

Patent Literature 1

Japanese Unexamined Patent Application, First Publication No. 2007-89250

Patent Literature 2

Japanese Unexamined Patent Application, First Publication No. 2018-148753

SUMMARY OF INVENTION

Technical Problem

There are problems that an amount of calculation becomes enormous in a case of a round-robin method described above and it is unclear whether a determined positioning configuration is optimum in a case of a know-how method.

Hence, an object of this invention is to provide a positioning configuration design device, a positioning configuration design method, and a program capable of solving the problems described above.

Solution to Problem

According to an aspect of the present disclosure, there is provided a positioning configuration design device including a positioning configuration setting unit that excludes facilities which are likely to be able to be excluded from the facilities respectively positioned at a plurality of locations and sets a positioning configuration of the facilities; a feasibility confirmation unit that judges whether predetermined conditions are feasible or not in the set positioning configuration; a storage unit that stores exclusion candidate list data in which information of the excludable facilities is registered and non-excludable list data in which information of the non-excludable facilities is registered; an exclusion candidate list updating unit that registers, in the exclusion candidate list data, information of the facilities excluded in the positioning configuration in which the conditions are feasible; a non-excludable list updating unit that registers, in the non-excludable list data, information of the facilities excluded in the positioning configuration in which the conditions are not feasible; and a control unit that repeatedly executes confirmation processing including setting of the positioning configuration, judgment of feasibility of the conditions, registration to the exclusion candidate list data, and registration to the non-excludable list data while incrementing the number of the facilities to be excluded one at a time until the positioning configuration in which the conditions are feasible and no further facilities are able to be excluded is able to be calculated. In the first confirmation processing, the positioning configuration setting unit sets a plurality of combinations of the positioning configurations by excluding the facilities one at a time from the plurality of facilities; the feasibility confirmation unit judges feasibility of the conditions for each of the plurality of combinations of the positioning configurations; the exclusion candidate list updating unit registers, in the exclusion candidate list data, the facilities excluded in the positioning configuration in which the conditions are feasible; and the non-excludable list updating unit registers, in the non-excludable list data, the facilities excluded in the positioning configuration in which the conditions are not feasible. In the nth (n is an integer larger than 1) confirmation processing, the exclusion candidate list updating unit registers, in the exclusion candidate list data, combinations in which the conditions are feasible of combinations of the n facilities to be excluded, and the non-excludable list updating unit registers, in the non-excludable list data, combinations in which the conditions are not feasible of the combinations of the n facilities to be excluded. In the n+1th confirmation processing, the positioning configuration setting unit sets as many combinations of the n+1 facilities to be excluded as possible from the combinations of the n facilities registered in the exclusion candidate list data such that the facilities and combinations of the facilities registered in the non-excludable list data are not included therein.

According to another aspect of the present disclosure, there is provided a positioning configuration design method including a step of excluding facilities which are likely to be able to be excluded from the facilities respectively positioned at a plurality of locations and setting a positioning configuration of the facilities; a step of judging whether predetermined conditions are feasible or not in the set positioning configuration of the facilities; a step of registering, in exclusion candidate list data which is stored in a storage unit and in which information of the excludable facilities is registered, information of the facilities excluded in the positioning configuration in which the conditions are feasible; and a step of registering, in non-excludable list data which is stored in the storage unit and in which information of the non-excludable facilities is registered, information of the facilities excluded in the positioning configuration in which the conditions are not feasible. Confirmation processing including the step of setting the positioning configuration, the step of judging whether the conditions are feasible or not, the step of performing registration to the exclusion candidate list data, and the step of performing registration to the non-excludable list data is repeatedly executed while the number of the facilities to be excluded is incremented one at a time until the positioning configuration in which the conditions are satisfied and no further facilities are able to be excluded is able to be calculated. In the first confirmation processing, a plurality of combinations of the positioning configurations are set by excluding the facilities one at a time from the plurality of facilities during the step of setting the positioning configuration, feasibility of the conditions is judged for each of the plurality of combinations of the positioning configurations during the step of judging whether the conditions are feasible or not, the facilities excluded in the positioning configuration in which the conditions are feasible are registered in the exclusion candidate list data during the step of performing registration to the exclusion candidate list data, and the facilities excluded in the positioning configuration in which the conditions are not feasible are registered in the non-excludable list data during the step of performing registration to the non-excludable list data. In the nth (n is an integer larger than 1) confirmation processing, combinations in which the conditions are feasible of combinations of the n facilities to be excluded are registered in the exclusion candidate list data during the step of performing registration to the exclusion candidate list data, and combinations in which the conditions are not feasible of the combinations of the n facilities to be excluded are registered in the non-excludable list data during the step of performing registration to the non-excludable list data. In the n+1th confirmation processing, as many combinations of the n+1 facilities to be excluded as possible are set from the combinations of the n facilities registered in the exclusion candidate list data such that the facilities and combinations of the facilities registered in the non-excludable list data are not included therein during the step of setting the positioning configuration.

According to another aspect of the present disclosure, there is provided a program causing a computer to execute processing having a step of excluding facilities which are likely to be able to be excluded from the facilities respectively positioned at a plurality of locations and setting a positioning configuration of the facilities, a step of judging whether predetermined conditions are feasible or not in the set positioning configuration of the facilities, a step of registering, in exclusion candidate list data which is stored in a storage unit and in which information of the excludable facilities is registered, information of the facilities excluded in the positioning configuration in which the conditions are feasible, and a step of registering, in non-excludable list data which is stored in the storage unit and in which information of the non-excludable facilities is registered, information of the facilities excluded in the positioning configuration in which the conditions are not feasible; to repeatedly execute confirmation processing including the step of setting the positioning configuration, the step of judging whether the conditions are feasible or not, the step of performing registration to the exclusion candidate list data, and the step of performing registration to the non-excludable list data while the number of the facilities to be excluded is incremented one at a time until the positioning configuration in which the conditions are satisfied and no further facilities are able to be excluded is able to be calculated; to set a plurality of combinations of the positioning configurations by excluding the facilities one at a time from the plurality of facilities during the step of setting the positioning configuration, judge feasibility of the conditions for each of the plurality of combinations of the positioning configurations during the step of judging whether the conditions are feasible or not, register, in the exclusion candidate list data, the facilities excluded in the positioning configuration in which the conditions are feasible during the step of performing registration to the exclusion candidate list data, and register, in the non-excludable list data, the facilities excluded in the positioning configuration in which the conditions are not feasible during the step of performing registration to the non-excludable list data, in the first confirmation processing; to register, in the exclusion candidate list data, combinations in which the conditions are feasible of combinations of the n facilities to be excluded during the step of performing registration to the exclusion candidate list data, and register, in the non-excludable list data, combinations in which the conditions are not feasible of the combinations of the n facilities to be excluded during the step of performing registration to the non-excludable list data, in the nth (n is an integer larger than 1) confirmation processing; and to set as many combinations of the n+1 facilities to be excluded as possible from the combinations of the n facilities registered in the exclusion candidate list data such that the facilities and combinations of the facilities registered in the non-excludable list data are not included therein during the step of setting the positioning configuration, in the n+1th confirmation processing.

ADVANTAGEOUS EFFECTS OF INVENTION

According to the present disclosure, it is possible to determine an optimum positioning configuration of power facilities with a smaller amount of calculation than that in the related art.

BRIEF DESCRIPTION OF DRAWINGS

FIG. 2 is a view illustrating an example of facilities which are positioning configuration design targets according to the first embodiment.

FIG. 3 is a view illustrating an example of an initial period model of the target facilities according to the first embodiment.

FIG. 4 is a flowchart showing an example of positioning configuration design processing according to the first embodiment.

FIG. 5 is an explanatory view of the positioning configuration design processing according to the first embodiment.

FIG. 6 is a view illustrating an example of a result of positioning configuration determining processing.

FIG. 8 is an explanatory view of setting processing of auxiliary facilities according to the second embodiment.

6

DESCRIPTION OF EMBODIMENTS

First Embodiment

System Configuration

Hereinafter, a measurement system according to a first embodiment of the present disclosure will be described with reference to FIGS. 1 to 6.

Figure 1:
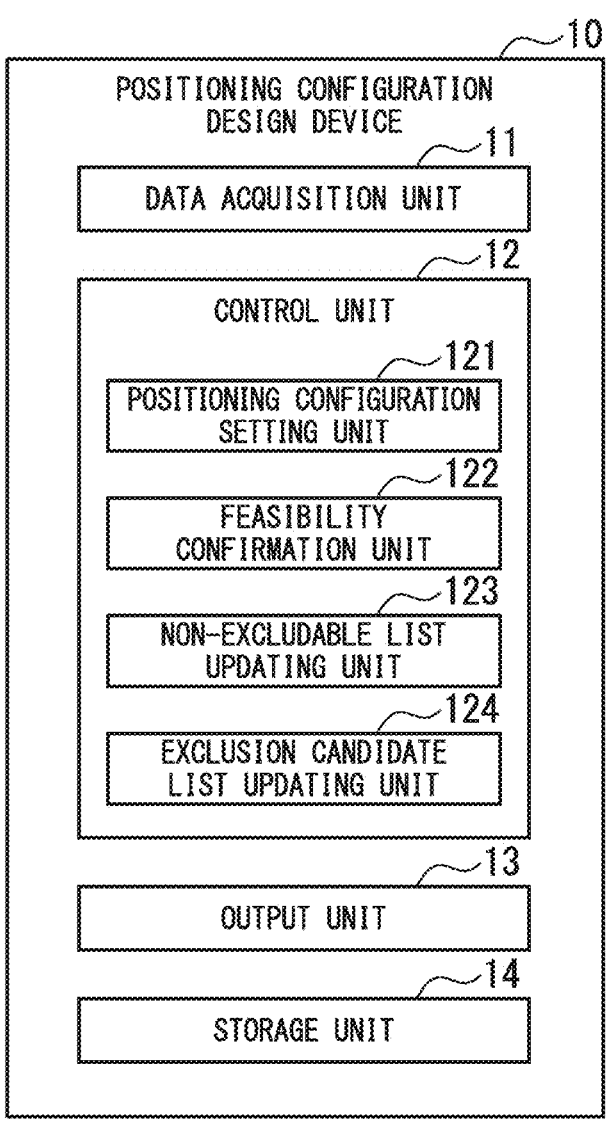
FIG. 1 is a block diagram illustrating an example of a positioning configuration design device according to a first embodiment.

FIG. 1 is a block diagram illustrating an example of a positioning configuration design device according to the first embodiment.

A positioning configuration design device 10 is constituted of a computer. As illustrated in FIG. 1, the positioning configuration design device 10 includes a data acquisition unit 11, a control unit 12, an output unit 13, and a storage unit 14.

The data acquisition unit 11 acquires data necessary for design of a positioning configuration of facilities. For example, the data acquisition unit 11 acquires an initial period model for facility positioning.

The control unit 12 controls processing of designing a positioning configuration of facilities (positioning configuration design processing). Positioning configuration design processing is processing of searching for the smallest positioning configuration of facilities satisfying predetermined conditions. The control unit 12 includes a positioning configuration setting unit 121, a feasibility confirmation unit 122, a non-excludable list updating unit 123, and an exclusion candidate list updating unit 124.

The positioning configuration setting unit 121 sets a positioning configuration of confirmation targets.

The feasibility confirmation unit 122 judges whether or not a positioning configuration of confirmation targets satisfies the predetermined conditions.

The non-excludable list updating unit 123 creates and updates a non-excludable list in which non-excludable facilities among all facilities are listed.

The exclusion candidate list updating unit 124 creates and updates an exclusion candidate list in which facilities that are likely to be able to be excluded among all facilities are listed.

The output unit 13 outputs results of the positioning configuration design processing to a display device or an electronic file.

The storage unit 14 stores data necessary for the positioning configuration design processing.

Figure 2:
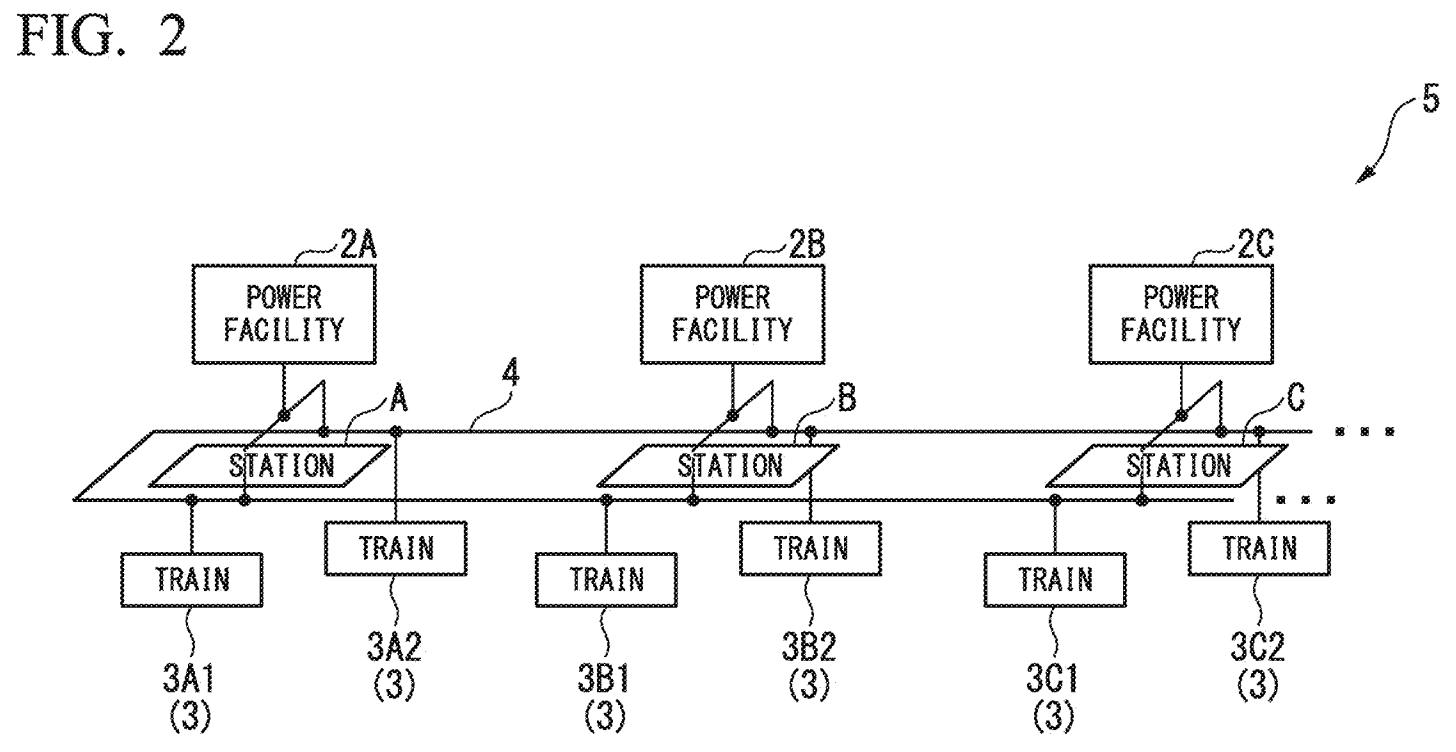

FIG. 2 is a view illustrating an example of facilities which are positioning configuration design targets according to the first embodiment.

For example, in a transportation system 5 illustrated in FIG. 2 as an example, the positioning configuration design device 10 determines positioning of a power facility 2A and the like connected to a power network 4 in order to supply power to trains 3A1 to 3C2 connected to the power network 4.

The transportation system 5 includes a plurality of power facilities 2A to 2C, a plurality of trains 3A1 to 3C2, and the power network 4. The power facilities 2A to 2C are candidates for power facilities to be positioned and are positioned for respective stations A to C.

In the transportation system 5, the power facilities 2A to 2C supply power to the trains 3A1 to 3C2 via the power network 4. Each of the trains 3A1 to 3C2 travels using power supplied from the power facility 2A and the like.

In design of power facilities in the transportation system 5, there is a need to determine capacities and locations of power facilities such that a voltage supplied to trains (for example, a voltage in trolley wires (feeder lines) at locations coming into contact with a pantograph) is included within a stipulated range in all sorts of operations which are operationally presumed. For example, when a situation in which a plurality of trains are running at the same time in the vicinity of the station A is presumed, if power facilities are installed far from the station A, there is concern that a voltage supplied to the trains 3A1 and 3A2 may fall due to a voltage drop and running ability may deteriorate. When conditions for a required voltage are not satisfied due to a voltage fall, there is a need to add correction to the design, such as increasing the capacities of the power facilities or bringing a power facility closer to the station A.

The positioning configuration design device 10 determines positioning of power facilities such that conditions required for operation of the trains 3A1 to 3C2 in the power facilities 2A to 2C are satisfied and the installation number and installation costs of the power facilities are minimized For example, conditions required for operation of the trains 3A1 to 3C2 are that the voltage supplied to each of the train 3A1 and the like is within a stipulated range.

Figure 3:
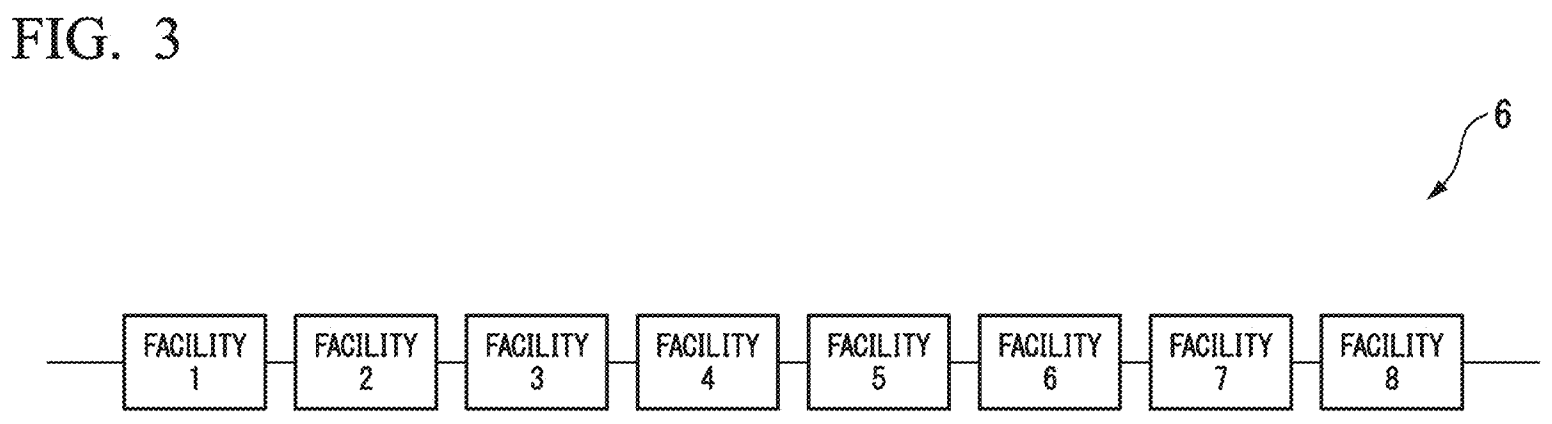

The positioning configuration design device 10 executes positioning configuration design processing of the power facility 2A and the like on the basis of an initial period model obtained by modeling initial period positioning of the power facilities 2A to 2C (examination targets) in FIG. 2. FIG. 3 illustrates an example of an initial period model 6 of power facilities when there are eight stations. The initial period model 6 illustrated in FIG. 3 as an example indicates that a state in which power facilities (facilities 1 to 8) are respectively positioned in the eight stations (not illustrated) is set as an initial period positioning configuration of the power facilities. The positioning configuration design device 10 optimizes positioning of the power facilities by excluding power facilities which can be excluded from this initial period positioning configuration.

For example, the positioning configuration design device 10 excludes the facility 1 and confirms whether the conditions for a supplied voltage are satisfied simply with the remaining facilities 2 to 8, and when the conditions are satisfied, the facility 1 is registered in the exclusion candidate list as a candidate for an excludable facility. In a case in which the conditions are not satisfied when the facility 1 is excluded, the positioning configuration design device 10 registers the facility 1 is the non-excludable list as a non-excludable facility. The positioning configuration design device 10 searches for combinations of excludable facilities by variously changing the combinations of facilities to be excluded from the facilities 1 to 8 while confirming feasibility of the conditions. However, instead of comprehensively creating combinations of facilities to be excluded and confirming feasibility of the conditions for each thereof as in a round-robin method in the related art, the positioning configuration design device 10 searches for combinations of excludable facilities while gradually narrowing down the candidates for a positioning configuration of confirmation targets. Specifically, (1) combinations of facilities to be excluded are created from the facilities registered in the exclusion candidate list such that combinations which have been registered in the non-excludable list are not included, and feasibility of the conditions in the positioning configuration in which the combinations are excluded is confirmed. (2) The combinations of the facilities in which the conditions are feasible are registered in the exclusion candidate list. (3) If combinations of the facilities in which the conditions are not feasible are found, the combinations are registered in the non-excludable list. (4) The processes (1) to (3) are repeated while incrementing the number of facilities to be combined. Next, with reference to FIGS. 4 and 5, regarding the initial period model 6 in FIG. 3, a method for searching for combinations of excludable facilities will be described in more detail.

Operation

Figure 4:
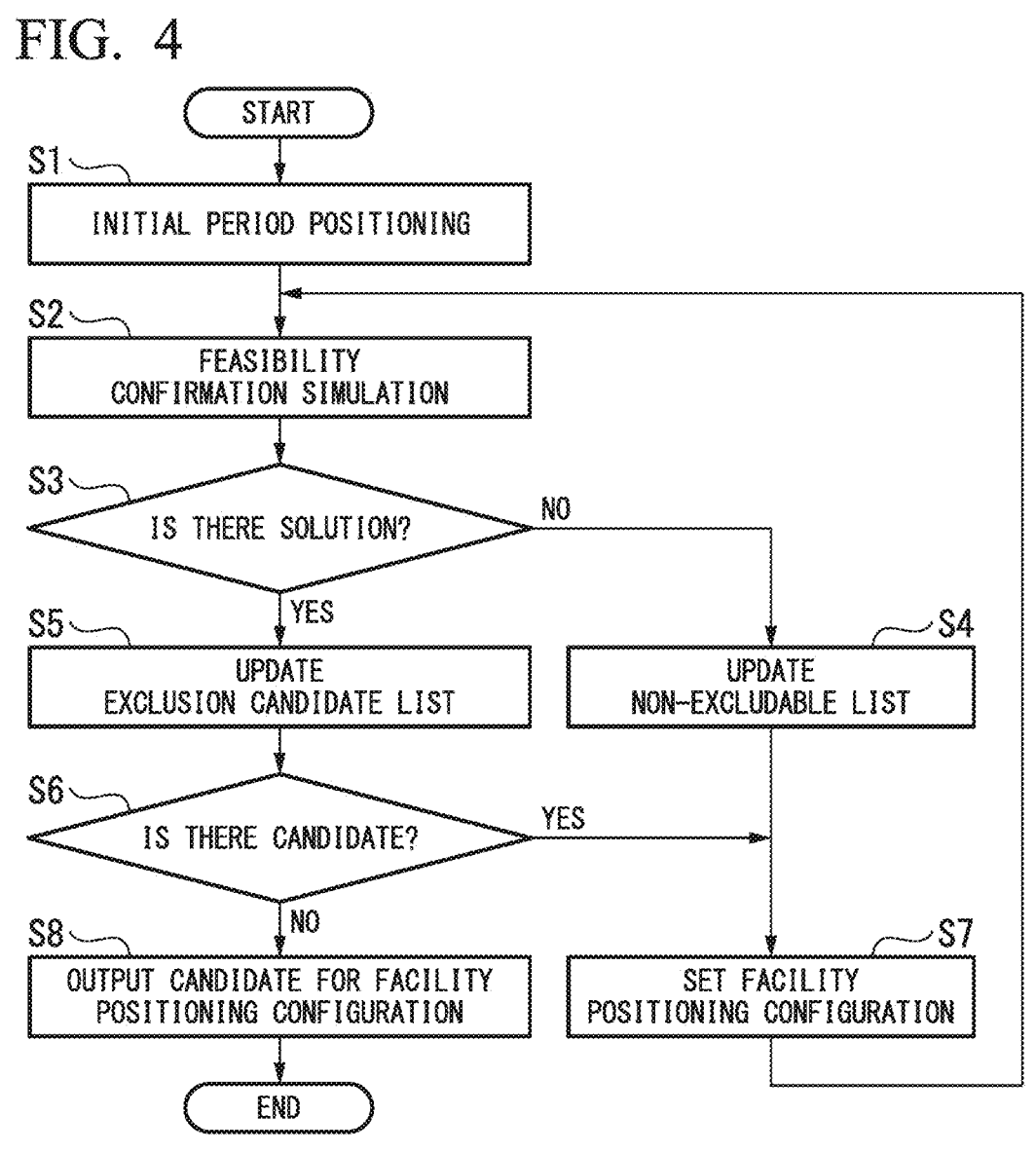

FIG. 4 is a flowchart showing an example of positioning configuration design processing according to the first embodiment.

FIG. 5 is an explanatory view of the positioning configuration design processing according to the first embodiment.

First, the data acquisition unit 11 acquires information indicating initial period positioning of the power facilities and records it in the storage unit 14 (Step S1). For example, the data acquisition unit 11 acquires the initial period model 6 illustrated in FIG. 3 as an example. The control unit 12 performs processing of determining a positioning configuration of facilities while having the initial period model 6 as a target.

First Confirmation Processing

The control unit 12 executes first confirmation processing. In the first confirmation processing, a feasibility confirmation simulation (which will be described below) is executed for each of the positioning configurations formed by excluding one facility from the initial period positioning.

First, the positioning configuration setting unit 121 creates all patterns for the positioning configuration of the facilities obtained by excluding one facility from the initial period facility positioning indicated by the initial period model 6 (eight combinations in the case of the initial period model 6).

Specifically, the positioning configuration setting unit 121 creates eight kinds of facility positioning configurations 1-1 to 1-8, such as the facility positioning configuration 1-1 in which the facility 1 is excluded, the facility positioning configuration 1-2 in which the facility 2 is excluded, and so on to the facility positioning configuration 1-8 in which the facility 8 is excluded. Next, the feasibility confirmation unit 122 executes the feasibility confirmation simulation for each of the facility positioning configurations 1-1 to 1-8 (Step S2). For example, regarding the facility positioning configuration 1-1, the feasibility confirmation unit 122 creates all patterns of operation patterns of the trains 3 and calculates a voltage supplied to each train for each operation pattern. For example, operation patterns of the trains 3 indicate distribution states of the trains 3 and positioning patterns of the trains 3 in all sorts of operations which are operationally presumed, such as a distribution state of the trains 3 in which the train is present in only the down-line direction of a station 1 corresponding to the facility 1 and the trains 3 are not present in the up-line direction of the station 1 and the up and down-line directions of other stations (referred to as an operation pattern 1), a distribution state of the trains 3 in which the trains are present in the up-line direction and the down-line direction of the station 1 and the trains 3 are not present in the up and down-line directions of other stations (referred to as an operation pattern 2), and so on to a distribution state of the trains 3 in which the trains 3 are present in the up and down-line directions of each of the eight stations 1 to 8. Regarding the operation patterns of the trains 3, all patterns may be registered in the storage unit 14 in advance. Regarding each of the operation patterns, the feasibility confirmation unit 122 calculates a voltage supplied from a neighboring power supply facility to all the trains 3 present in the operation pattern. For example, in the case of the foregoing operation pattern 1, a voltage supplied to the train present in the down-line direction of the station 1 from any of the facilities 2 to 8 excluding the excluded facility 1 is calculated. In the case of the operation pattern 2, a voltage supplied to the train present in the up-line direction and the train present in the down-line direction of the station 1 from any of the facilities 2 to 8 is calculated. Regarding all the operation patterns, the feasibility confirmation unit 122 calculates a voltage supplied to each of the trains. A method for calculating a voltage may be an arbitrary method. The feasibility confirmation unit 122 records power calculated for each train in association with the operation pattern in the storage unit 14.

When a value which is not included within a predetermined stipulated range is included in the voltages calculated for the facility positioning configuration 1-1, the feasibility confirmation unit 122 judges that there is no solution for the facility positioning configuration 1-1 (the facility 1 cannot be excluded), and when all the calculated voltages are included in the stipulated range, the feasibility confirmation unit 122 judges that there is a solution (the facility 1 is excludable) (Step S3).

The feasibility confirmation unit 122 also creates all patterns of the operation patterns for other facility positioning configurations 1-2 to 1-8, and the feasibility confirmation unit 122 performs the feasibility confirmation simulation and judges whether or not there is a solution for each of the operation patterns. Regarding the processing of the feasibility confirmation simulation in Step S2, it is possible to use the method described in Patent Literature 2.

In the case in which there is no solution (Step S3; No), the non-excludable list updating unit 123 updates the non-excludable list (Step S4). For example, in the case in which there is no solution for the facility positioning configuration 1-1, the non-excludable list updating unit 123 registers the non-excludable facility 1 in the non-excludable list.

In the case in which there is a solution (Step S3; Yes), the exclusion candidate list updating unit 124 updates the exclusion candidate list (Step S5). For example, in the case there is a solution for the facility positioning configuration 1-2, the exclusion candidate list updating unit 124 registers the excludable facility 2 in the exclusion candidate list.

Here, as a result of the first confirmation processing, it is assumed that a result that the facilities 1, 4, 6, and 8 cannot be excluded (there is no solution) is obtained and a result that the facilities 2, 3, 5, and 7 can be excluded (there is a solution) is obtained. The non-excludable list updating unit 123 registers the facilities 1, 4, 6, and 8 in the non-excludable list. The exclusion candidate list updating unit 124 registers the facilities 2, 3, 5, and 7 in the exclusion candidate list. Table in FIG. 5 shows the results of the first confirmation processing (line of the number of times of processing=first processing).

Next, the control unit 12 judges the presence or absence of a candidate for the facility positioning configuration of the confirmation targets in the next confirmation processing. When there is a candidate (Step S6; Yes), the procedure proceeds to the processing of Step S7. When there is no candidate (Step S6; No), the procedure proceeds to the processing of Step S8.

For example, with reference to the exclusion candidate list and the non-excludable list, the control unit 12 judges that there is a candidate if combinations of the facilities of exclusion targets can be created in the next confirmation processing and that there is no candidate if combinations of the facilities of exclusion targets cannot be created. When the next processing is second confirmation processing, if two facilities can be selected from the exclusion candidate list and combined without being contradictory to those listed in the non-excludable list, the control unit 12 judges that there is a candidate. In the case of this example, it is judged that there is a candidate.

Second Confirmation Processing

When it is judged that there is a candidate in Step S7, the second confirmation processing is executed.

First, the positioning configuration setting unit 121 sets the facility positioning configuration of the confirmation targets in the current confirmation processing on the basis of the exclusion candidate list and the non-excludable list (Step S7). Since current processing is the second confirmation processing, the positioning configuration setting unit 121 sets a facility positioning configuration in which two of the facilities 1 to 8 are excluded. At this time, regarding two excluded facilities, the positioning configuration setting unit 121 sets the facilities registered in the exclusion candidate list as targets and does not set the facilities registered in the non-excludable list as exclusion targets. For example, with reference to FIG. 5, as a result of the first confirmation processing, the facilities registered in the exclusion candidate list are the facilities 2, 3, 5, and 7. The facilities registered in the non-excludable list are the facilities 1, 4, 6, and 8. The positioning configuration setting unit 121 sets only the facilities 2, 3, 5, and 7 registered in the exclusion candidate list as the exclusion targets and creates all patterns of the facility positioning configuration in which two thereof are excluded. Specifically, the positioning configuration setting unit 121 creates six combinations of the facility positioning configurations, such as a facility positioning configuration 2-1 in which the facility 2 and the facility 3 are excluded, a facility positioning configuration 2-2 in which the facility 2 and the facility 5 are excluded, a facility positioning configuration 2-3 in which the facility 2 and the facility 7 are excluded, a facility positioning configuration 2-4 in which the facility 3 and the facility 5 are excluded, a facility positioning configuration 2-5 in which the facility 3 and the facility 7 are excluded, and a facility positioning configuration 2-6 in which the facility 5 and the facility 7 are excluded.

In the second confirmation processing, the feasibility confirmation simulation is executed for each of the six created combinations of the positioning configurations.

The control unit 12 executes the feasibility confirmation simulation while setting the six newly-created combinations of the facility positioning configurations as targets (Step S2).

Specifically, regarding each of the facility positioning configurations 2-1 to 2-6, the positioning configuration setting unit 121 creates all patterns of the operation patterns of the trains 3 and calculates a voltage supplied to each train for each operation pattern.

Regarding each of the facility positioning configurations 2-1 to 2-6, the feasibility confirmation unit 122 judges the presence or absence of a solution (Step S3). The feasibility confirmation unit 122 performs judgment whether or not the voltage, which is supplied to the trains 3, calculated for all the operation patterns of each of the facility positioning configurations 2-1 to 2-6 is included in the stipulated range. A case in which all the calculated voltages are included in the stipulated range will be regarded to have a solution, and a case in which they are not included will be regarded to have no solution.

In the case in which there is no solution (Step S3; No), the non-excludable list updating unit 123 registers combinations of the non-excludable facilities in the non-excludable list. In the case in which there is a solution (Step S3; Yes), the exclusion candidate list updating unit 124 registers the combinations of the excludable facilities in the exclusion candidate list.

Here, as a result of the second confirmation processing, it is assumed that there is a solution resultingly in the facility positioning configurations other than the facility positioning configuration 2-1. The non-excludable list updating unit 123 registers the combination of the facility 2 and the facility 3 in the non-excludable list. The exclusion candidate list updating unit 124 registers the combination of two other excludable facilities in the exclusion candidate list. Table in FIG. 5 shows the results of the second confirmation processing (line of the number of times of processing=second processing).

Next, the control unit 12 judges the presence or absence of a candidate for the facility positioning configuration of the confirmation targets in the next confirmation processing. When there is a candidate (Step S6; Yes), the procedure proceeds to the processing of Step S7. When there is no candidate (Step S6; No), the procedure proceeds to the processing of Step S8.

When the next processing is third confirmation processing, if three facilities can be selected from the exclusion candidate list and combined without being contradictory to those listed in the non-excludable list (for example, the facility 2 and the facility 3), the control unit 12 judges that there is a candidate. In the case of the example in FIG. 5, for example, since the facility 2, the facility 5, and the facility 7 can be combined (this combination is not contradictory to the list stating that the facility 2 and the facility 3 registered in the non-excludable list cannot be combined), the control unit 12 judges that there is a candidate.

Third Confirmation Processing

When it is judged that there is a candidate in Step S7, the third confirmation processing is executed.

First, the positioning configuration setting unit 121 sets the facility positioning configuration of the confirmation targets in the third confirmation processing on the basis of the exclusion candidate list and the non-excludable list (Step S7). Since current processing is third processing, the positioning configuration setting unit 121 sets a facility positioning configuration in which three of the facilities 1 to 8 are excluded. In addition, regarding three excluded facilities, the positioning configuration setting unit 121 sets the facilities registered in the exclusion candidate list as targets and does not set the facilities and combinations of the facilities registered in the non-excludable list as exclusion targets. For example, with reference to FIG. 5, as a result of the second processing, the facilities registered in the exclusion candidate list include a combination of the facility 2 and the facility 5, a combination of the facility 2 and the facility 7, a combination of the facility 3 and the facility 5, a combination of the facility 3 and the facility 7, and a combination of the facility 5 and the facility 7. The facilities and combinations of the facilities registered in the non-excludable list include the facilities 1, 4, 6, and 8 and a combination of the facility 2 and the facility 3. The positioning configuration setting unit 121 sets the foregoing combination registered in the exclusion candidate list as the exclusion target and creates all patterns of the facility positioning configuration in which three of the facilities included therein are excluded such that the combination of the facility 2 and the facility 3 registered in the non-excludable list is not included therein. Specifically, the positioning configuration setting unit 121 creates two combinations of the facility positioning configurations, such as a facility positioning configuration 3-1 in which the facility 2, the facility 5, and the facility 7 are excluded, and a facility positioning configuration 3-2 in which the facility 3, the facility 5, and the facility 7 are excluded.

Since the combination of the facility 2 and the facility 3 is registered in the non-excludable list in current (third) processing, the positioning configuration setting unit 121 does not create the facility positioning configuration in which the facility 2, the facility 3, and the facility 5 are excluded, or the facility positioning configuration in which the facility 2, the facility 3, and the facility 7 are excluded.

In the third confirmation processing, the feasibility confirmation simulation is executed for each of the two created combinations of the positioning configurations.

The control unit 12 executes a third feasibility confirmation simulation while setting the two newly-created combinations of the facility positioning configurations 3-1 to 3-2 as targets (Step S2).

Next, regarding each of the facility positioning configurations 3-1 to 3-2, the feasibility confirmation unit 122 judges the presence or absence of a solution (Step S3).

In the case in which there is no solution (Step S3; No), the non-excludable list updating unit 123 registers the combinations of the three non-excludable facilities in the non-excludable list. In the case in which there is a solution (Step S3; Yes), the exclusion candidate list updating unit 124 registers the combinations of the excludable facilities in the exclusion candidate list.

Here, as a result of the third feasibility confirmation simulation, it is assumed that all the facility positioning configurations have resulted in having a solution. The exclusion candidate list updating unit 124 registers the combination of three excludable facilities in the exclusion candidate list. Since there is no facility positioning configuration having no solution, the non-excludable list updating unit 123 does not update the non-excludable list. Table in FIG. 5 shows the results of the third processing in the line of the third processing.

Next, the control unit 12 judges the presence or absence of a candidate for the facility positioning configuration of the confirmation targets in the next processing (Step S6). When there is a candidate (Step S6; Yes), the procedure proceeds to the processing of Step S7. When there is no candidate (Step S6; No), the procedure proceeds to the processing of Step S8.

When the next processing is fourth processing, if four facilities can be selected from the exclusion candidate list and combined without being contradictory to those listed in the non-excludable list (for example, the facility 2 and the facility 3), the control unit 12 judges that there is a candidate. In the case of the example in FIG. 5, for example, since the four facilities cannot be combined such that the combination of the facility 2 and the facility 3 is not included therein, the control unit 12 judges that there is no candidate. This means that no further processing is necessary because all the combinations of the excludable facilities have been examined in the previous processing performed three times. Since the judgment in Step S6 is No, the control unit 12 ends the positioning configuration design processing with respect to the initial period model illustrated in FIG. 3 as an example. In the case of this example, the facilities 2, 5, and 7 or the facilities 3, 5, and 7 are candidates for exclusion. Namely, the facilities 1, 3, 4, 6, and 8 or the facility 1, 2, 4, 6, and 8 are candidates for the power facilities to be actually positioned. Last, the output unit 13 outputs the candidate for the facility positioning configuration (Step S8). For example, the output unit 13 may output an image illustrated in FIG. 6 as an example, or the like, in addition to outputting the last remaining exclusion candidate list illustrated in FIG. 5 as an example in text.

Figure 6:
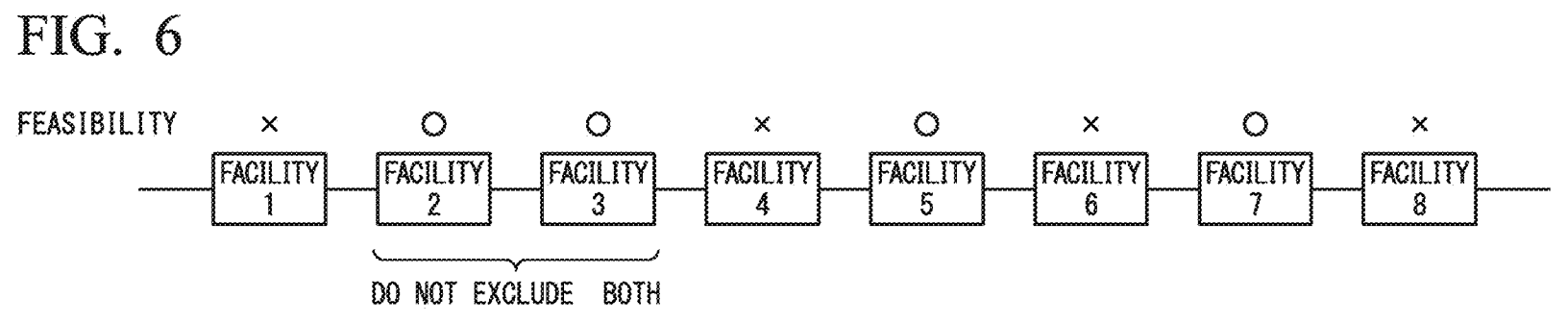

FIG. 6 illustrates an example of a result of positioning configuration determining processing.

The facilities 1, 4, 6, and 8 marked with x in feasibility in FIG. 6 are power facilities which cannot be excluded. Positioning in which the facility 2 or the facility 3 is added thereto is a configuration for minimizing the number of facilities while satisfying the conditions required to supply power to the trains 3.

From the two candidates, the control unit 12 may further select a combination of the facilities in which costs or capacities are minimized on the basis of the cost or the capacity of each facility.

According to a method in the related art, in general, the smallest facility positioning configuration is determined by calculating a combination of excludable facilities in a round-robin way from the initial period model 6 in FIG. 3 and executing the feasibility confirmation simulation in Step S2 for each of the facilities, or optimum facility positioning is determined based on the experience or the know-how of a designer. In the former method, the amount of calculation becomes massive and it takes to time until an optimum facility positioning configuration is determined, and in the latter method, there is a likelihood that the determined facility positioning configuration may not be an optimum solution. In contrast, according to the present embodiment, it is possible to determine optimum facility positioning in a short period of time with a smaller amount of calculation than that in the round-robin method in the related art by registering non-excludable facilities or combinations of the facilities in the non-excludable list and searching for combinations of excludable facilities while increasing the scale of the combinations of the facilities to be excluded (the number of facilities) such that the facilities and combinations of the facilities registered in the non-excludable list are not included therein. In addition, since all combinations of the excludable facilities are examined without relying on the know-how of a designer, it is possible to obtain a candidate for an optimum facility positioning configuration.

In the foregoing Examples, an example of design of a positioning configuration such as the power supply facility 2A in the transportation system 5 has been described, but applications of the present embodiment are not limited thereto. For example, positioning of base stations or antennas used in mobile communication may be determined using the positioning configuration determining processing of the present embodiment.

Second Embodiment

Hereinafter, a positioning configuration design device 10A according to a second embodiment of the present invention will be described with reference to FIGS. 7 to 9.

Figure 7:
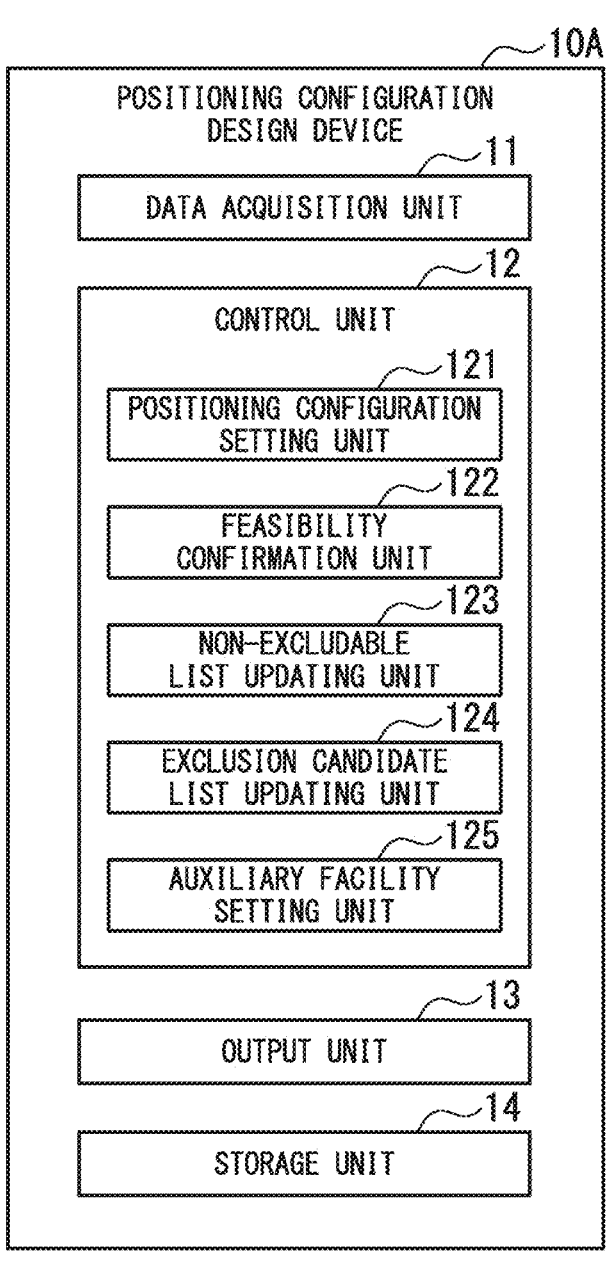
FIG. 7 is a block diagram illustrating an example of a positioning configuration design device according to a second embodiment.

FIG. 7 is a block diagram illustrating an example of the positioning configuration design device according to the second embodiment.

In the constituent elements of the positioning configuration design device 10A according to the second embodiment of the present disclosure, the same reference signs are applied to the same constituent elements as the positioning configuration design device 10 according to the first embodiment, and description thereof is omitted. In addition to the configuration of the first embodiment, the positioning configuration design device 10A includes an auxiliary facility setting unit 125.

In the first embodiment, when a certain power facilities is excluded, the feasibility confirmation simulation is executed, and if the voltage supplied to the trains 3 is equal to or greater than a threshold, the facility can be excluded. According to this method, the minimum facility positioning configuration can be calculated in terms of calculation, but in the scene of actual operation of the trains 3, a situation in which the voltage supplied to the trains 3 does not have much margin may arise. Hence, the auxiliary facility setting unit 125 designs positioning of an auxiliary facility such as an up-down connection resistance 8 or an auxiliary feeder line 7 in accordance with a situation of the voltage supplied to each of the trains 3 calculated during the feasibility confirmation simulation.

Figure 8:
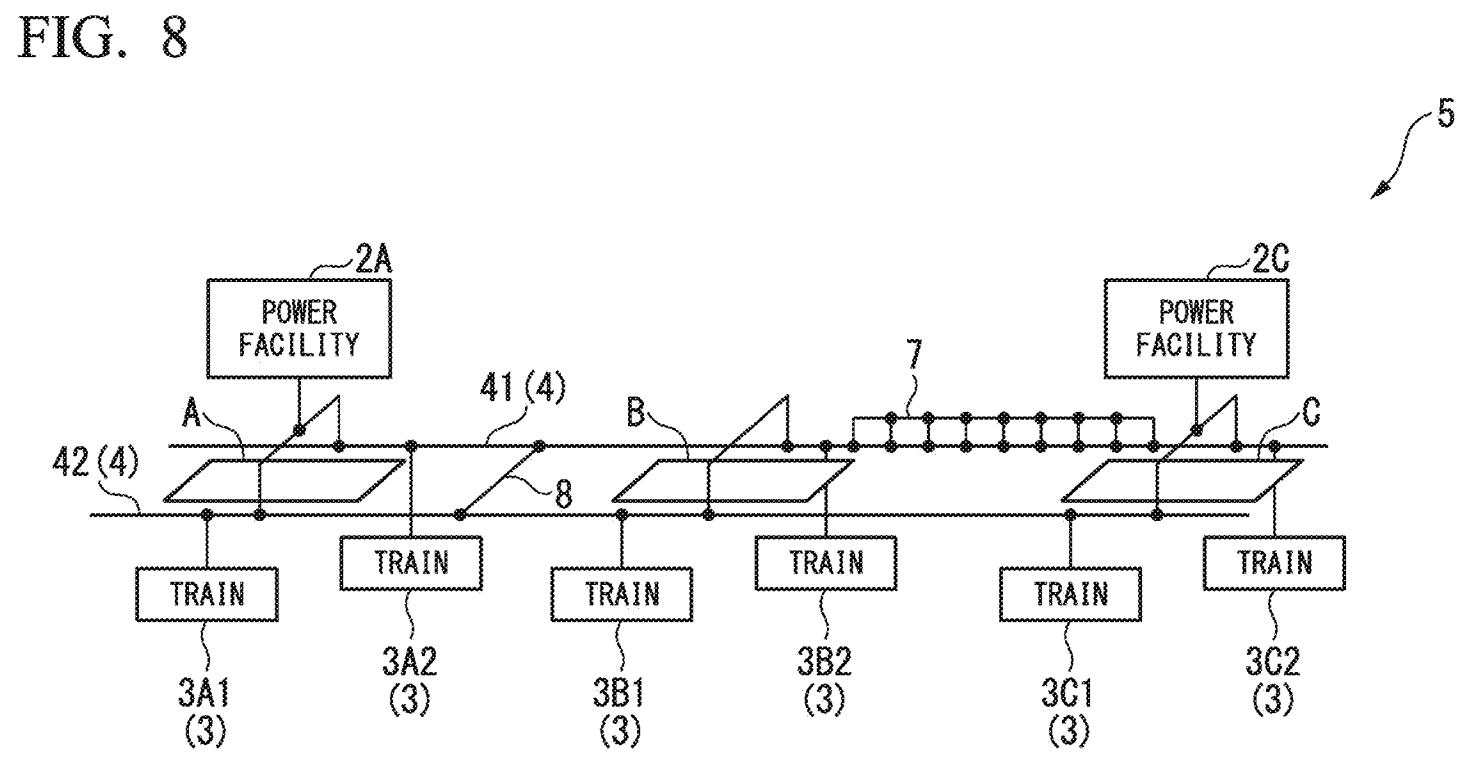

FIG. 8 is an explanatory view of setting processing of auxiliary facilities according to the second embodiment.

The auxiliary facility setting unit 125 reads, from the storage unit 14, a voltage calculated through the feasibility confirmation simulation (Step S2) regarding the facility positioning configuration ultimately determined as a candidate for an optimum positioning configuration in the positioning configuration determining processing which has been described using FIG. 4. Further, the auxiliary facility setting unit 125 determines that the auxiliary feeder line 7 is provided in the vicinity of the location where the voltage in the power network 4 becomes the smallest. Accordingly, a voltage fall in the vicinity of the location can be curbed.

In addition, when the locations between an up-line 41 in which a voltage drop in the power network 4 is significant and a down-line 42 with a margin for a voltage drop are close to each other, or when the locations between the down-line 42 in which a voltage drop in the power network 4 is significant and the up-line 41 with a margin for a voltage drop are close to each other, the auxiliary facility setting unit 125 determines that the up-down connection resistance 8 connecting the up-line 41 and the down-line 42 at this location is provided. Accordingly, in a gradient portion of the voltage, flexibility of power between the up-line and the down-line can be made efficient.

Figure 9:
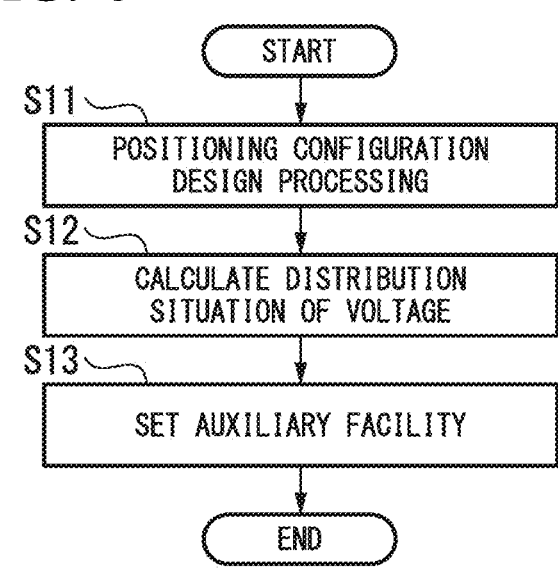
FIG. 9 is a flowchart showing an example of setting processing of the auxiliary facilities according to the second embodiment.
Figure 10:
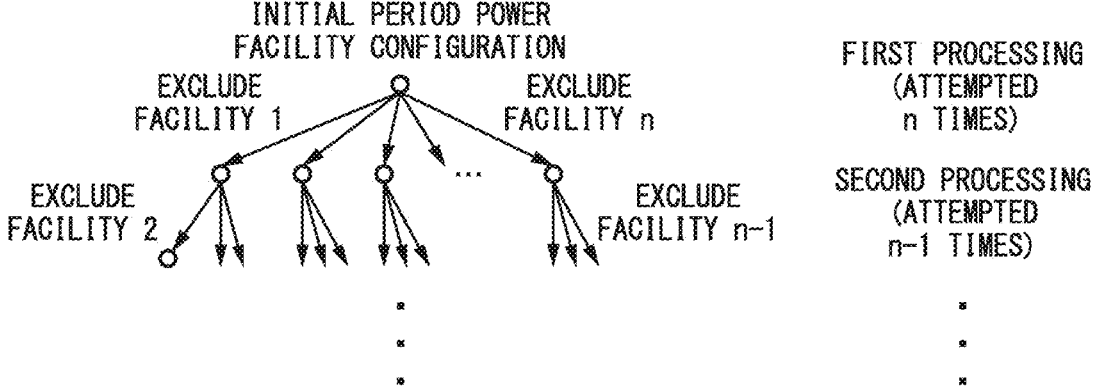
FIG. 10 is a view illustrating an example of positioning configuration determining processing in the related art.

FIG. 9 is a flowchart showing an example of setting processing of the auxiliary facilities according to the second embodiment.

First, the positioning configuration design device 10A executes the positioning configuration design processing described in FIG. 4 (Step S11). Next, the auxiliary facility setting unit 125 reads, from the storage unit 14, a voltage supplied to the trains 3 calculated regarding a candidate for the facility positioning configuration which has been ultimately determined.

The auxiliary facility setting unit 125 calculates a distribution situation of a voltage in the power network 4 on the basis of the read voltage (Step S12). For example, regarding a certain location in the power network 4, if a voltage at the location is calculated X times for each operation pattern, the auxiliary facility setting unit 125 may set the average value of the voltages which has been calculated X times, as the voltage at the location.

The auxiliary facility setting unit 125 sets the auxiliary facility in the power network 4 on the basis of the distribution situation of the voltage (Step S13). For example, the auxiliary facility setting unit 125 sets the auxiliary feeder line 7 in the vicinity of the location where the voltage becomes the smallest. For example, when the locations between the up-line in which a voltage drop is significant and the down-line with a margin for a voltage drop are close to each other, the auxiliary facility setting unit 125 sets the up-down connection resistance 8 in the location. For example, the output unit 13 may output a schematic view of the transportation system 5 in which the auxiliary facilities illustrated in FIG. 8 as an example are set to the display device.

According to the second embodiment, it is possible to perform design with a margin for the aspect of safety by adding setting of auxiliary facilities to positioning of minimum power facilities with respect to the power network 4.

Figure 11:
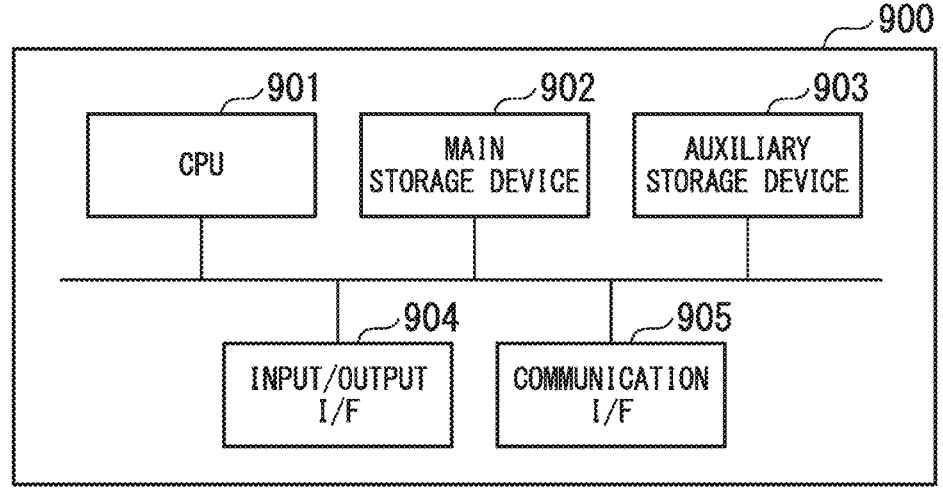
FIG. 11 is a view illustrating an example of a hardware configuration of the positioning configuration design device according to each of the embodiments of the present disclosure.

FIG. 11 is a view illustrating an example of a hardware configuration of the positioning configuration design device according to each of the embodiments of the present disclosure.

A computer 900 includes a CPU 901, a main storage device 902, an auxiliary storage device 903, an input/output interface 904, and a communication interface 905.

The positioning configuration design devices 10 and 10A described above are mounted in the computer 900. Further, each of the functions described above is stored in the auxiliary storage device 903 in a form of a program. The CPU 901 reads the program from the auxiliary storage device 903, develops it in the main storage device 902, and executes the foregoing processing in accordance with the program. In addition, the CPU 901 secures a storage domain in the main storage device 902 in accordance with the program. In addition, the CPU 901 secures a storage domain in the auxiliary storage device 903 for storing data during processing in accordance with the program.

Processing by each of the functional units may be performed by recording a program for realizing all or some of the functions of the positioning configuration design devices 10 and 10A in a computer readable recording medium, causing a computer system to read and execute the program recorded in this recording medium. "A computer system" mentioned herein includes hardware such as an OS and peripheral equipment. In addition, when the WWW system is utilized, "a computer system" includes a homepage-provided environment (or a display environment). In addition, "a computer readable recording medium" indicates a portable medium such as a CD, a DVD, or a USB, or a storage device such as a hard disk built into the computer system. In addition, when this program is delivered to the computer 900 through a communication line, the computer 900 which has received delivery may execute the foregoing processing by developing the program in the main storage device 902. In addition, the foregoing program may be a program for realizing some of the functions described above or may also be a program capable of realizing the functions described above in combination with a program which has already been recorded in the computer system. In addition, the positioning configuration design devices 10 and 10A may be constituted of a plurality of computers 900.

Furthermore, it is possible to suitably replace the constituent elements in the foregoing embodiments with known constituent elements within a range not departing from the gist of the present invention. In addition, the technical scope of this invention is not limited to the foregoing embodiments, and it is possible to add various changes within a range not departing from the gist of the present invention.

Appendix

The positioning configuration design devices 10 and 10A, the positioning configuration design method, and the program described in each of the embodiments are ascertained as follows, for example.

(1) According to a first aspect, the positioning configuration design devices 10 and 10A include the positioning configuration setting unit 121 that excludes facilities which are likely to be able to be excluded from the facilities (the power facilities 2A to 2C and the facilities 1 to 8) respectively positioned at a plurality of locations and sets a positioning configuration of the facilities (the facility positioning configurations 1-1 to 1-8, the facility positioning configurations 2-1 to 2-6, and the facility positioning configurations 3-1 and 3-2); the feasibility confirmation unit 122 that judges whether predetermined conditions are feasible or not in the set positioning configuration; the storage unit 14 that stores the exclusion candidate list data in which information of the excludable facilities is registered and the non-excludable list data in which information of the non-excludable facilities is registered; the exclusion candidate list updating unit 124 that registers, in the exclusion candidate list data, information of the facilities excluded in the positioning configuration in which the conditions are feasible; the non-excludable list updating unit 123 that registers, in the non-excludable list data, information of the facilities excluded in the positioning configuration in which the conditions are not feasible; and the control unit 12 that repeatedly executes confirmation processing including setting of the positioning configuration, judgment of feasibility of the conditions, registration to the exclusion candidate list data, and registration to the non-excludable list data while incrementing the number of the facilities to be excluded one at a time until the positioning configuration in which the conditions are feasible and no further facilities are able to be excluded is able to be calculated. In the first confirmation processing, the positioning configuration setting unit 121 sets a plurality of combinations of the positioning configurations by excluding the facilities one at a time from the plurality of facilities; the feasibility confirmation unit 122 judges feasibility of the conditions for each of the plurality of combinations of the positioning configurations; the exclusion candidate list updating unit 124 registers, in the exclusion candidate list data, the facilities excluded in the positioning configuration in which the conditions are feasible; and the non-excludable list updating unit 123 registers, in the non-excludable list data, the facilities excluded in the positioning configuration in which the conditions are not feasible. In the nth (n is an integer larger than 1) confirmation processing, the exclusion candidate list updating unit 124 registers, in the exclusion candidate list data, combinations in which the conditions are feasible of combinations of the n facilities to be excluded; and the non-excludable list updating unit 123 registers, in the non-excludable list data, combinations in which the conditions are not feasible of combinations of the n facilities to be excluded. In the n+1th confirmation processing, the positioning configuration setting unit 121 sets as many combinations of the n+1 facilities to be excluded as possible from the combinations of the n facilities registered in the exclusion candidate list data such that the facilities and combinations of the facilities registered in the non-excludable list data are not included therein.

Accordingly, it is possible to reduce the number of facility positioning configurations for confirming whether the conditions are satisfied and calculate an optimum positioning configuration of the facilities with a small amount of calculation.

(2) The positioning configuration design devices 10 and 10A according to a second aspect are the positioning configuration design devices 10 and 10A according to (1), in which the control unit 12 ends execution of the confirmation processing when the combinations of the n facilities are not able to be created any longer such that combinations of the facilities registered in the non-excludable list data are not included therein in the nth confirmation processing.

Accordingly, it is possible to confirm the presence or absence of combination of facilities which has to be subjected to confirmation whether they are able to be excluded.

(3) The positioning configuration design device 10A according to a third aspect is the positioning configuration design device 10A according to (1) to (2), in which the control unit 12 sets the auxiliary feeder line 7 in the vicinity of a location where a value of a voltage becomes the smallest in the power network 4 when the positioning configurations of the power facilities 2A to 2B supplying power to the trains 3 connected to the power network 4 has been calculated.

(4) The positioning configuration design device 10A according to a fourth aspect is the positioning configuration design device 10A according to (1) to (3), in which the control unit 12 sets the up-down connection resistance 8 connecting the up-line 41 in which a voltage drop in the power network 4 is equal to or greater than the threshold and the down-line 42 in which a voltage drop therein is smaller than the threshold when the positioning configuration of the power facilities 2A to 2C supplying power to the trains 3 connected to the power network 4 has been calculated.

According to the third and fourth aspects, it is possible to perform design with a margin for the aspect of safety with respect to positioning of minimum power facilities.

(5) According to a fifth aspect, the positioning configuration design method includes a step of excluding facilities which are likely to be able to be excluded from the facilities respectively positioned at a plurality of locations and setting a positioning configuration of the facilities; a step of judging whether predetermined conditions are feasible or not in the set positioning configuration of the facilities; a step of registering, in the exclusion candidate list data which is stored in the storage unit 14 and in which information of the excludable facilities is registered, information of the facilities excluded in the positioning configuration in which the conditions are feasible; and a step of registering, in the non-excludable list data which is stored in the storage unit 14 and in which information of the non-excludable facilities is registered, information of the facilities excluded in the positioning configuration in which the conditions are not feasible. Confirmation processing including the step of setting the positioning configuration, the step of judging whether the conditions are feasible or not, the step of performing registration to the exclusion candidate list data, and the step of performing registration to the non-excludable list data is repeatedly executed while the number of the facilities to be excluded is incremented one at a time until the positioning configuration in which the conditions are satisfied and no further facilities are able to be excluded is able to be calculated. In the first confirmation processing, a plurality of combinations of the positioning configurations are set by excluding the facilities one at a time from the plurality of facilities during the step of setting the positioning configuration, feasibility of the conditions is judged for each of the plurality of combinations of the positioning configurations during the step of judging whether the conditions are feasible or not, the facilities excluded in the positioning configuration in which the conditions are feasible are registered in the exclusion candidate list data during the step of performing ration to the exclusion candidate list data, and the facilities excluded in the positioning configuration in which the conditions are not feasible are registered in the non-excludable list data during the step of performing registration to the non-excludable list data. In the nth (n is an integer larger than 1) confirmation processing, combinations in which the conditions are feasible of combinations of the n facilities to be excluded are registered in the exclusion candidate list data during the step of performing registration to the exclusion candidate list data, combinations in which the conditions are not feasible of the combinations of the n facilities to be excluded are registered in the non-excludable list data during the step of performing registration to the non-excludable list data. In the n+1th confirmation processing, as many combinations of the n+1 facilities to be excluded as possible are set from the combinations of the n facilities registered in the exclusion candidate list data such that the facilities and combinations of the facilities registered in the non-excludable list data are not included therein during the step of setting the positioning configuration.

(6) According to a sixth aspect, the program causes the computer 900 to execute processing having a step of excluding facilities which are likely to be able to be excluded from the facilities respectively positioned at a plurality of locations and setting a positioning configuration of the facilities, a step of judging whether predetermined conditions are feasible or not in the set positioning configuration of the facilities, a step of registering, in the exclusion candidate list data which is stored in the storage unit 14 and in which information of the excludable facilities is registered, information of the facilities excluded in the positioning configuration in which the conditions are feasible, and a step of registering, in the non-excludable list data which is stored in the storage unit 14 and in which information of the non-excludable facilities is registered, information of the facilities excluded in the positioning configuration in which the conditions are not feasible is registered; to repeatedly execute confirmation processing including the step of setting the positioning configuration, the step of judging whether the conditions are feasible or not, the step of performing registration to the exclusion candidate list data, and the step of performing registration to the non-excludable list data while the number of the facilities to be excluded is incremented one at a time until the positioning configuration in which the conditions are satisfied and no further facilities are able to be excluded is able to be calculated; to set a plurality of combinations of the positioning configurations by excluding the facilities one at a time from the plurality of facilities during the step of setting the positioning configuration, judge feasibility of the conditions for each of the plurality of combinations of the positioning configurations during the step of judging whether the conditions are feasible or not, register, in the exclusion candidate list data, the facilities excluded in the positioning configuration in which the conditions are feasible during the step of performing registration to the exclusion candidate list data, and register, in the non-excludable list data, the facilities excluded in the positioning configuration in which the conditions are feasible during the step of performing registration to the non-excludable list data, in the first confirmation processing; to register, in the exclusion candidate list data, combinations in which the conditions are feasible of combinations of the n facilities to be excluded during the step of performing registration to the exclusion candidate list data, and register, in the non-excludable list data, combinations in which the conditions are not feasible of the combinations of the n facilities to be excluded during the step of performing registration to the non-excludable list data, in the nth (n is an integer larger than 1) confirmation processing; and to set as many n+1 combinations of the facilities to be excluded as possible from the combinations of the n facilities registered in the exclusion candidate list data such that the facilities and combinations of the facilities registered in the non-excludable list data are not included therein during the step of setting the positioning configuration, in the n+1th confirmation processing.

REFERENCE SIGNS LIST 10, 10A Positioning configuration design device
11 Data acquisition unit
12 Control unit
121 Positioning configuration setting unit
122 Feasibility confirmation unit
123 Non-excludable list updating unit
124 Exclusion candidate list updating unit
125 Auxiliary facility setting unit
13 Output unit
14 Storage unit
900 Computer
901 CPU
902 Main storage device
903 Auxiliary storage device
904 Input/output interface
905 Communication interface

The invention claimed is:

1. A positioning configuration design device for calculating a smallest positioning configuration for positioning a plurality of facilities, wherein the facilities indicate power facilities which provide trains with power, wherein the positioning configuration design device comprises:

a control unit that repeatedly executes confirmation processing including processing of setting the positioning configuration while excluding the facilities, in which conditions that a voltage supplied to trains is included within a stipulated range are not feasible when the facilities are excluded, from an exclusion target and processing of judging whether the conditions are feasible or not in the set positioning configuration while incrementing the number of the facilities to be excluded one at a time until the positioning configuration in which the conditions are feasible in the positioning configuration of the facilities and no further facilities are able to be excluded is able to be calculated, a storage unit that stores exclusion candidate list data in which information of the excludable facilities allowing the conditions to be feasible even when the facilities are excluded is registered and non-excludable list data in which information of the non-excludable facilities not allowing the conditions to be feasible when the facilities are excluded is registered;

an exclusion candidate list updating unit that registers, in the exclusion candidate list data, information of the facilities excluded in the positioning configuration in which the conditions are feasible; and a non-excludable list updating unit that registers, in the non-excludable list data, information of the facilities excluded in the positioning configuration in which the conditions are not feasible, wherein in the first confirmation processing, the control unit sets the plurality of combinations of the positioning configurations by excluding the facilities one at a time from the plurality of facilities and judges whether the conditions are feasible or not for each of the plurality of combinations of the positioning configurations, the exclusion candidate list updating unit registers, in the exclusion candidate list data, the facilities excluded in the positioning configuration in which the conditions are feasible, and the non-excludable list updating unit registers, in the non-excludable list data, the facilities excluded in the positioning configuration in which the conditions are not feasible.

2. The positioning configuration design device according to claim 1, wherein in the nth (n is an integer larger than 1) confirmation processing, the exclusion candidate list updating unit registers, in the exclusion candidate list data, combinations in which the conditions are feasible of combinations of the n facilities to be excluded, and the non-excludable list updating unit registers, in the non-excludable list data, combinations in which the conditions are not feasible of the combinations of the n facilities to be excluded.

3. The positioning configuration design device according to claim 1, wherein in the n+1th confirmation processing, the control unit sets as many combinations of the n+1 facilities to be excluded as possible from the combinations of the n facilities registered in the exclusion candidate list data such that the facilities and combinations of the facilities registered in the non-excludable list data are not included therein.

4. The positioning configuration design device according to claim 1, wherein the control unit ends execution of the confirmation processing when the combinations of the n facilities are not able to be created any longer such that combinations of the facilities registered in the non-excludable list data are not included therein in the nth confirmation processing.

5. The positioning configuration design device according to claim 1, wherein the control unit sets an auxiliary feeder line in the vicinity of a location where a value of a voltage becomes the smallest in a power network when the positioning configuration of power facilities supplying power to trains has been calculated.

6. The positioning configuration design device according to claim 1, wherein the control unit sets an up-down connection resistance connecting an up-line in which a voltage drop in the power network is equal to or greater than a threshold and a down-line in which a voltage drop therein is smaller than the threshold when the positioning configuration of power facilities supplying power to trains has been calculated.

7. A positioning configuration design method for calculating a smallest positioning configuration for positioning a plurality of facilities, wherein the facilities indicate power facilities which provide trains with power, wherein in the positioning configuration design method, confirmation processing including a step of setting the positioning configuration while excluding the facilities, in which conditions that a voltage supplied to trains is included within a stipulated range are not feasible when the facilities are excluded, from an exclusion target and a step of judging whether the conditions are feasible or not in the set positioning configuration is repeatedly executed while incrementing the number of the facilities to be excluded one at a time until the positioning configuration in which the conditions are feasible in the positioning configuration of the facilities and no further facilities are able to be excluded is able to be calculated, wherein in the first confirmation processing, setting the plurality of combinations of the positioning configurations by excluding the facilities one at a time from the plurality of facilities and judging whether the conditions are feasible or not for each of the plurality of combinations of the positioning configurations, registering, in the exclusion candidate list data, the facilities excluded in the positioning configuration in which the conditions are feasible, and registering, in the non-excludable list data, the facilities excluded in the positioning configuration in which the conditions are not feasible.

8. A non-transitory computer-readable medium storing a program for calculating a smallest positioning configuration for positioning a plurality of facilities, wherein the facilities indicate power facilities which provide trains with power, wherein the program causes a computer to repeatedly execute confirmation processing including a step of setting the positioning configuration while excluding the facilities, in which conditions that a voltage supplied to trains is included within a stipulated range are not feasible when the facilities are excluded, from an exclusion target and a step of judging whether the conditions are feasible or not in the set positioning configuration while incrementing the number of the facilities to be excluded one at a time until the positioning configuration in which the conditions are feasible in the positioning configuration of the facilities and no further facilities are able to be excluded is able to be calculated, wherein in the first confirmation processing, setting the plurality of combinations of the positioning configurations by excluding the facilities one at a time from the plurality of facilities and judging whether the conditions are feasible or not for each of the plurality of combinations of the positioning configurations, registering, in the exclusion candidate list data, the facilities excluded in the positioning configuration in which the conditions are feasible, and registering, in the non-excludable list data, the facilities excluded in the positioning configuration in which the conditions are not feasible.

* * * * *